United States Patent
Chen et al.

(10) Patent No.: US 10,846,954 B2
(45) Date of Patent: Nov. 24, 2020

(54) METHOD FOR MONITORING VEHICLE AND MONITORING APPARATUS

(71) Applicant: BEIJING XIAOMI MOBILE SOFTWARE CO., LTD., Beijing (CN)

(72) Inventors: Tao Chen, Beijing (CN); Ke Wu, Beijing (CN); Huayijun Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 323 days.

(21) Appl. No.: 15/896,901

(22) Filed: Feb. 14, 2018

(65) Prior Publication Data

US 2018/0232968 A1    Aug. 16, 2018

(30) Foreign Application Priority Data

Feb. 14, 2017 (CN) .......................... 2017 1 0079431

(51) Int. Cl.
G07C 5/08 (2006.01)
G08G 1/00 (2006.01)
H04N 7/18 (2006.01)
G08G 1/123 (2006.01)

(52) U.S. Cl.
CPC ........... *G07C 5/0841* (2013.01); *G08G 1/123* (2013.01); *G08G 1/205* (2013.01); *H04N 7/188* (2013.01)

(58) Field of Classification Search
CPC .................................................. G07C 5/0841
See application file for complete search history.

(56) References Cited

U.S. PATENT DOCUMENTS

| | | | | |
|---|---|---|---|---|
| 3,780,314 A | * | 12/1973 | Inose | B60R 21/013 307/121 |
| 8,125,529 B2 | * | 2/2012 | Skoskiewicz | H04N 5/232 348/116 |
| 8,970,699 B2 | * | 3/2015 | Xiao | B60R 25/305 348/143 |
| 9,852,636 B2 | * | 12/2017 | Chow | G08G 1/04 |

(Continued)

FOREIGN PATENT DOCUMENTS

| CN | 1034255731 A | 12/2013 |
|---|---|---|
| CN | 204821442 U | 12/2015 |

(Continued)

OTHER PUBLICATIONS

Extended European Search Report dated May 18, 2018 in European Patent Application No. 17202567.8, 7 pages.
(Continued)

*Primary Examiner* — Michael A Berns
(74) *Attorney, Agent, or Firm* — Oblon, McClelland, Maier & Neustadt, L.L.P.

(57) ABSTRACT

The present disclosure relates to a method and an apparatus for monitoring a vehicle. The method includes receiving, by a monitoring device, a monitoring request from a vehicle-mounted device, wherein the monitoring request includes location information of the vehicle, and the vehicle-mounted device sends the monitoring request when detecting a collision of the vehicle; adjusting at least one of a direction and a focal length of a lens based on the location information of the vehicle; collecting environment data of the vehicle via the adjusted lens; and storing the environment data.

20 Claims, 15 Drawing Sheets

(56) References Cited

U.S. PATENT DOCUMENTS

| | | | |
|---|---|---|---|
| 9,858,488 B2* | 1/2018 | Fukawa | G08G 1/166 |
| 10,075,681 B2* | 9/2018 | Ross | G11B 15/026 |
| 10,317,771 B2* | 6/2019 | Kim | G02F 1/29 |
| 10,516,858 B2* | 12/2019 | Watanabe | G08B 13/19656 |
| 2003/0038878 A1 | 2/2003 | Lee et al. | |
| 2008/0291278 A1 | 11/2008 | Zhang et al. | |
| 2012/0162423 A1 | 6/2012 | Xiao et al. | |
| 2015/0063776 A1 | 3/2015 | Ross et al. | |
| 2018/0077355 A1 | 3/2018 | Kouno | |

FOREIGN PATENT DOCUMENTS

| | | |
|---|---|---|
| CN | 105336173 A | 2/2016 |
| CN | 106327911 A | 1/2017 |
| WO | WO 2016/147581 A1 | 9/2016 |

OTHER PUBLICATIONS

Office Action dated Jan. 9, 2020 in corresponding European Patent Application No. 17 202 567.8, 10 pages.

Office Action dated Nov. 20, 2018 in corresponding Chinese Patent Application No. 201710079431.5 (with English Translation), 29 pages.

\* cited by examiner

METHOD FOR MONITORING VEHICLE AND MONITORING APPARATUS

CROSS-REFERENCE TO RELATED APPLICATIONS

This application is based on and claims priority to Chinese Patent Application Serial No. 201710079431.5, filed on Feb. 14, 2017, the entire contents of which are incorporated herein by reference.

FIELD

The present disclosure relates to a field of vehicle technology, and more particularly, to a method and an apparatus for monitoring a vehicle.

BACKGROUND

One purpose for vehicle monitoring is to provide evidence for a traffic accident. At present, in a scene of parking surveillance, an environment of a vehicle cannot be recorded clearly and effectively or may be missed generally due to a viewing angle of a monitor, such as a sight dead zone. To this end, an automobile data recorder may be mounted on the vehicle to record videos and sounds during the entire driving process. The automobile data recorder may be powered-up by the vehicle itself, thereby monitoring the environment of the vehicle after flameout of the vehicle. However, only some high-end vehicles are provided with the automobile data recorder and the automobile data recorder has a high requirement for the battery in the vehicle. Moreover, the cost for mounting the automobile data recorder afterwards is high.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for monitoring a vehicle. The method includes receiving, by a monitoring device, a monitoring request from a vehicle-mounted device, wherein the monitoring request includes location information of the vehicle, and the vehicle-mounted device sends the monitoring request when detecting a collision of the vehicle; adjusting at least one of a direction and a focal length of a lens based on the location information of the vehicle; collecting environment data of the vehicle via the adjusted lens; and storing the environment data.

According to an aspect, after receiving the monitoring request, the method includes sending the monitoring request from the monitoring device to monitors connected to the monitoring device.

In an example, the method includes determining a distance between the monitoring device and the vehicle based on the location information; comparing the distance to a threshold; adjusting the at least one of the direction and the focal length of the lens when the distance between the monitoring device and the vehicle is less than the threshold; and sending the monitoring request from the monitoring device to monitors connected to the monitoring device when the distance between the monitoring device and the vehicle is greater than or equal to the threshold.

According to an aspect, before receiving the monitoring request, the method includes establishing one of a wired connection and a wireless connection between the monitoring device and the vehicle-mounted device, wherein the one of the wired connection and the wireless connection is used for communicating between the monitoring device and the vehicle-mounted device.

According to another aspect, the method includes sending a prompt message from the monitoring device to a vehicle management device, wherein the prompt message is configured to report the collision of the vehicle.

In an example, the environment data includes information on vehicles that are moving in proximity of the vehicle, information on objects including individuals that are moving in proximity of the vehicle, and information on vehicles that are parked in proximity of the vehicle.

Aspects of the disclosure also provide another method for monitoring a vehicle. The method includes monitoring, by a vehicle-mounted device, an operating parameter of the vehicle; detecting a collision of the vehicle based on the operating parameter; determining location information of the vehicle in response to detecting the collision of the vehicle; and sending a monitoring request from the vehicle-mounted device to a monitoring device, wherein the monitoring request includes the location information of the vehicle and the monitoring request is configured to request the monitoring device to monitor the vehicle.

According to an aspect, when detecting the collision of the vehicle, the method includes detecting a change of a vibration amplitude of the vehicle; comparing the change of the vibration amplitude to a threshold; and detecting the collision of the vehicle when the change of the vibration amplitude of the vehicle is greater than the threshold.

According to another aspect, when detecting the collision of the vehicle, the method includes determining, a vibration amplitude of the vehicle; comparing the vibration amplitude to a threshold; and detecting the collision of the vehicle when the vibration amplitude of the vehicle is greater than the threshold.

Aspects of the disclosure also provide an apparatus for monitoring a vehicle. The apparatus includes a processor and a memory configured to store at least one instruction executable by the processor. The processor is configured to receive, by a monitoring device, a monitoring request from a vehicle-mounted device, wherein the monitoring request includes location information of the vehicle, and the vehicle-mounted device sends the monitoring request when detecting a collision of the vehicle; adjust at least one of a direction and a focal length of a lens based on the location information of the vehicle; collect environment data of the vehicle via the adjusted lens; and store the environment data.

Aspects of the disclosure also provide an apparatus for monitoring a vehicle. The apparatus includes a processor and a memory configured to store at least one instruction executable by the processor. The processor is configured to monitor, by a vehicle-mounted device, an operating parameter of the vehicle; detect a collision of the vehicle based on the operating parameter; determine location information of the vehicle in response to detecting the collision of the vehicle; and send a monitoring request from the vehicle-mounted device to a monitoring device, wherein the monitoring request includes the location information of the vehicle and the monitoring request is configured to request the monitoring device to monitor the vehicle.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of example aspects do not represent all implementations consistent with the disclosure. Instead, they are merely examples of apparatuses and methods consistent with aspects related to the disclosure as recited in the appended claims.

Figure 1:
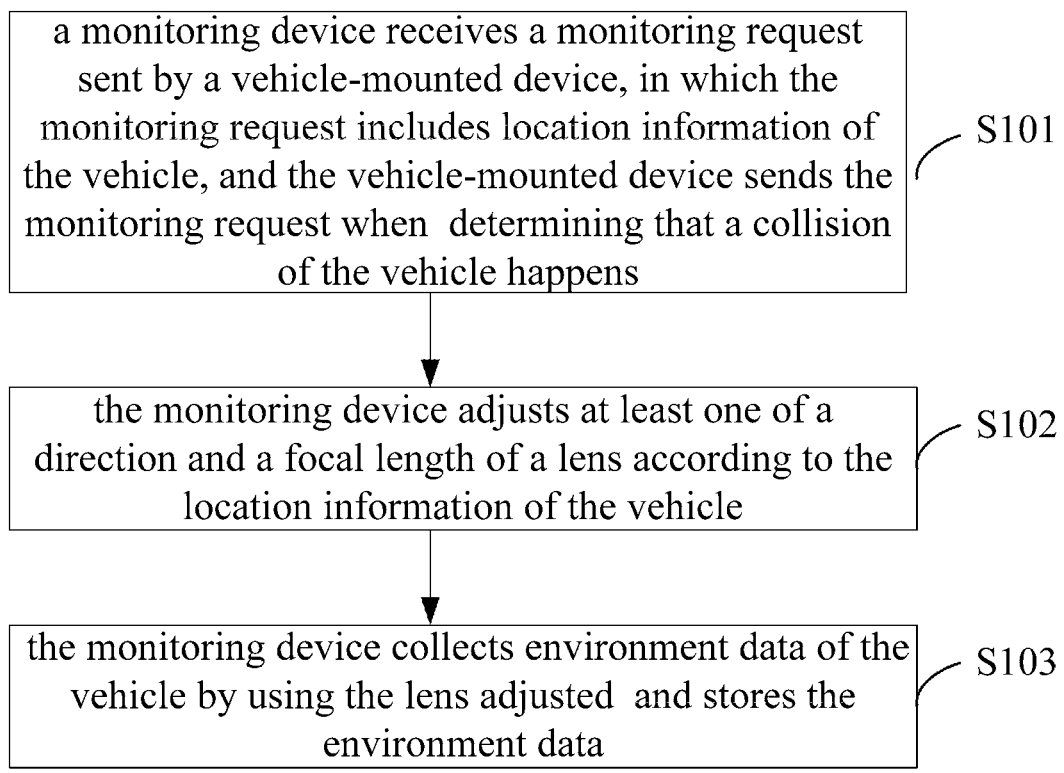
FIG. 1 is a flow chart of a method for monitoring a vehicle according to an exemplary aspect of the present disclosure.

FIG. 1 is a flow chart of a method for monitoring a vehicle according to an example aspect. As shown in FIG. 1, the method includes followings.

At block S101, a monitoring device receives a monitoring request sent by a vehicle-mounted device, in which the monitoring request includes location information of the vehicle, and the vehicle-mounted device sends the monitoring request when determining that a collision of the vehicle happens.

The monitoring request is configured to request the monitoring device to monitor the vehicle. The location information of the vehicle included in the monitoring request is acquired by the vehicle-mounted device using a Global Positioning System (GPS for short) module.

The monitoring device may be a 360° surveillance camera capable of collecting data with 360°. The monitoring device may need to communicate with the vehicle-mounted device and may be capable of processing multiple monitoring requests. The monitoring device may be mounted in an indoor parking lot or an outdoor parking lot and the like. For example, the monitoring device may be mounted on a ceiling of the indoor parking lot. Generally, several monitoring devices may be mounted in a parking lot, and the monitoring devices may be connected with each other in a wireless or wired manner for communications.

The vehicle-mounted device may be a driving computer built in the vehicle, and the driving computer includes a gravity sensor, a gyroscope, a communicating module, a GPS module and a control module etc. The gravity sensor and the gyroscope may detect an operating parameter of the vehicle, the control module may determine whether a collision happens according to the operating parameter, the communicating module is configured to communicate with the monitoring device, and the GPS module is configured to detect the location information of the vehicle. The vehicle-mounted device also may be a portable smart device such as a smart phone, a smart bracelet, a smart watch and the like. The smart device has the same functions as the driving computer. Furthermore, the existing smart devices may be configured as the vehicle-mounted device to keep the monitoring cost low.

In this aspect, the vehicle-mounted device may send the monitoring request to the monitoring device in a wireless or a wired manner. The wireless manner may be bluetooth or Wireless Fidelity (WIFI for short) and the like. The wired manner may be suitable for an electric vehicle, in which the electric vehicle may be connected to a charging pile and charged via a connecting line. The connecting line may also be used to transmit data, the monitoring device may be set on the charging pile. Alternatively, the monitoring device is not set on the charging pile, but connected to the charging pile via a connecting line so as to form a wired connection.

At block S102, the monitoring device adjusts at least one of a direction and a focal length of a lens according to the location information of the vehicle.

The monitoring device may determine an orientation of the vehicle according to the location information of the vehicle, the direction and/or the focal length of the lens may be adjusted according to the orientation. The direction of the lens may be adjusted to align the lens with the vehicle, and the focal length of the lens may be adjusted such that the lens is capable of capturing clear pictures.

At block S103, the monitoring device collects environment data of the vehicle by using the lens adjusted and stores the environment data.

The monitoring device may store the collected environment data locally, and send the environment data to a vehicle management device when the vehicle management device requests the environment data of the vehicle. The monitoring device may send the environment data to the vehicle management device periodically. The environment data may include information on vehicles moving around the vehicle, information on individuals moving around the vehicle and information on vehicles parking around the vehicle.

In the aspect, the monitoring device receives a monitoring request sent by a vehicle-mounted device when determining that a collision of the vehicle happens, adjusts the direction and/or the focal length of the lens according to the location information of the vehicle included in the monitoring request, collects environment data of the vehicle by using the lens adjusted, and stores the environment data. In this way, by adjusting the direction and/or the focal length of the lens according to the location information, the vehicle may be monitored specifically, and the monitoring pictures are clear and effective. Compared to the method of mounting an automobile data recorder on the vehicle, the cost in this way is low.

Figure 2:
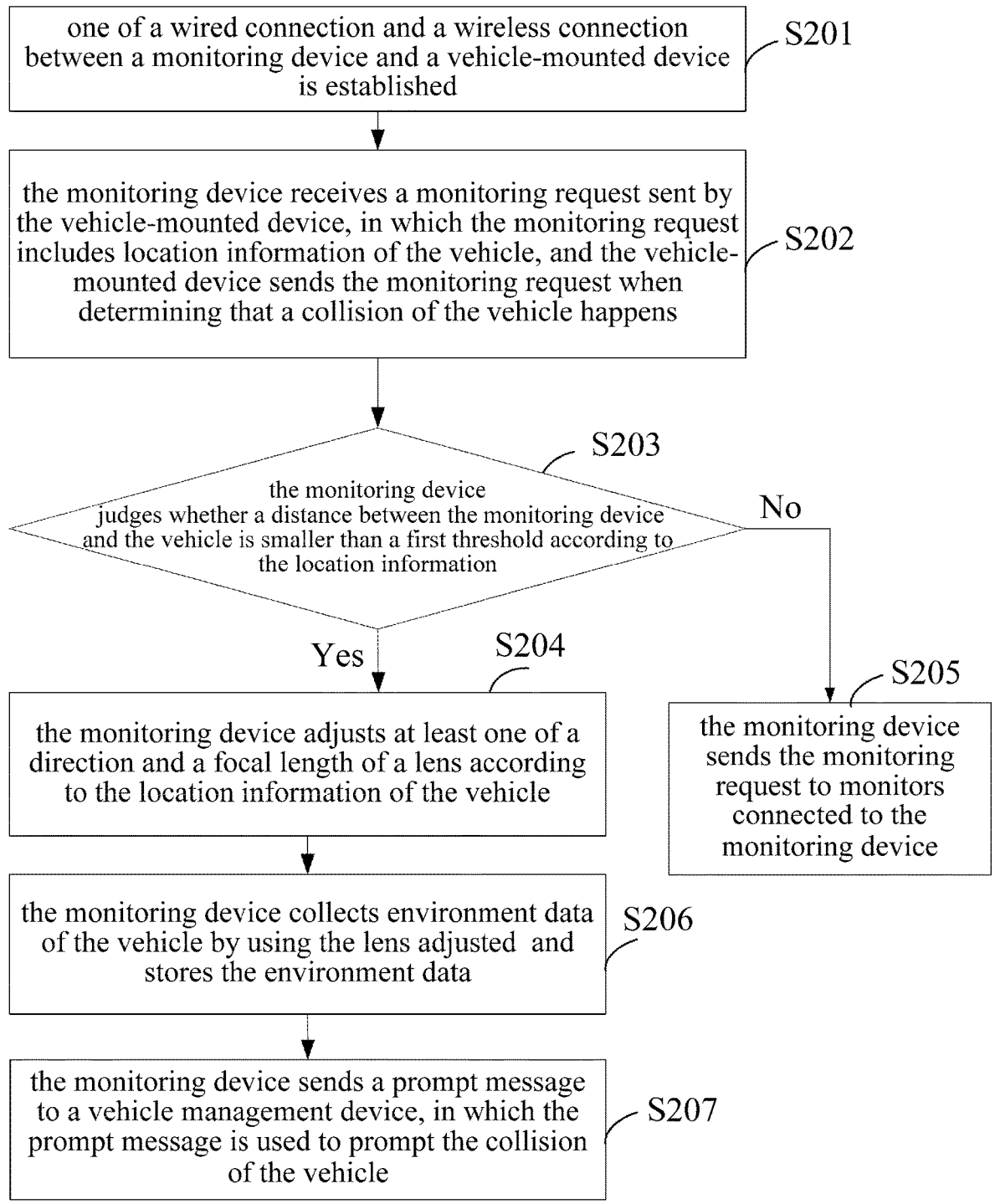
FIG. 2 is a flow chart of a method for monitoring a vehicle according to an exemplary aspect of the present disclosure.

Based on the aspect shown in FIG. 1, FIG. 2 is a flow chart of a method for monitoring a vehicle according to an example aspect. As shown in FIG. 2, the method includes followings.

At block S201, one of a wired connection and a wireless connection between a monitoring device and a vehicle-mounted device is established.

The wireless connection may be a bluetooth connection or a WIFI connection. Typically, the vehicle-mounted device initiates establishing the wireless connection. The wireless connection between the monitoring device and the vehicle-mounted device may be established once the vehicle-mounted device enters the parking lot or when the vehicle-mounted device has data to be sent to the monitoring device. The later manner may save energy of the vehicle-mounted device. Take the bluetooth connection as an example, after the vehicle enters the parking lot, a bluetooth matching may be performed between the vehicle-mounted device and the monitoring device installed in the parking lot, so as to establish the bluetooth connection. Take the WIFI connection as an example, after the vehicle enters the parking lot for the first time, the user may input a WIFI password manually, of course, it is possible that no WIFI password is set. When the vehicle enters the parking lot again, the WIFI connection with the monitoring device may be automatically established.

Regarding the wired connection, generally, the user may need to connect the vehicle-mounted device and the monitoring device by operating the connecting line manually.

At block S202, the monitoring device receives a monitoring request sent by the vehicle-mounted device, in which the monitoring request includes location information of the vehicle, and the vehicle-mounted device sends the monitoring request when determining that a collision of the vehicle happens.

At block S203, the monitoring device judges whether a distance between the monitoring device and the vehicle is smaller than a first threshold according to the location information.

When the distance between the monitoring device and the vehicle is smaller than the first threshold, act at block S204 is performed. When the distance between the monitoring device and the vehicle is greater than or equal to the first threshold, act at block S205 is performed.

At block S204, the monitoring device adjusts at least one of a direction and a focal length of a lens according to the location information of the vehicle.

When the distance between the monitoring device and the vehicle is smaller than the first threshold, act at block S204 is performed. If the distance between the monitoring device and the vehicle is smaller than the first threshold, it indicates that the monitoring device is close to the vehicle. When the monitoring device is far away from the vehicle, it is unable to capture clear pictures by adjusting the direction and/or the focal length of the lens.

At block S205, the monitoring device sends the monitoring request to monitors connected to the monitoring device.

When the distance between the monitoring device and the vehicle is greater than or equal to the first threshold, it indicates that the monitoring device is far away from the vehicle, the monitoring device sends the monitoring request to monitors connected to the monitoring device, such that the monitors may monitor the vehicle according to the monitoring request. The monitoring device may send the monitoring request to a plurality of monitors, and the plurality of monitors may monitor the vehicle. The plurality of monitors may be arranged around the vehicle such that the vehicle may be fully monitored.

At block S206, the monitoring device collects environment data of the vehicle by using the lens adjusted and stores the environment data.

Act at block S206 is performed after the block S204.

At block S207, the monitoring device sends a prompt message to a vehicle management device, in which the prompt message is used to prompt the collision of the vehicle.

If the monitoring device receives the monitoring request, it indicates that the collision happens, and thus the monitoring device sends the prompt message to the vehicle management device to prompt the collision of the vehicle. The vehicle management device acquires the environment data form the monitoring device according to the prompt message and performs an analysis on the environment data, so as to instruct the owner of the vehicle to deal with the collision in time.

In this aspect, before the monitoring device adjusts the direction and/or the focal length of the lens according to the location information of the vehicle, the monitoring device may judge whether a distance between the monitoring device and the vehicle is smaller than a first threshold according to the location information. When the distance between the monitoring device and the vehicle is smaller than the first threshold, the monitoring device adjusts the direction and/or the focal length of the lens; when the distance between the monitoring device and the vehicle is greater than or equal to the first threshold, the monitoring device sends the monitoring request to monitors connected to the monitoring device, such that the monitors may monitor the vehicle and the vehicle at any position may be monitored. In addition, after the monitoring device receives the monitoring request, the monitoring device sends the prompt message to the vehicle management device, such that managers of the vehicle can deal with the collision in time.

Figure 3:
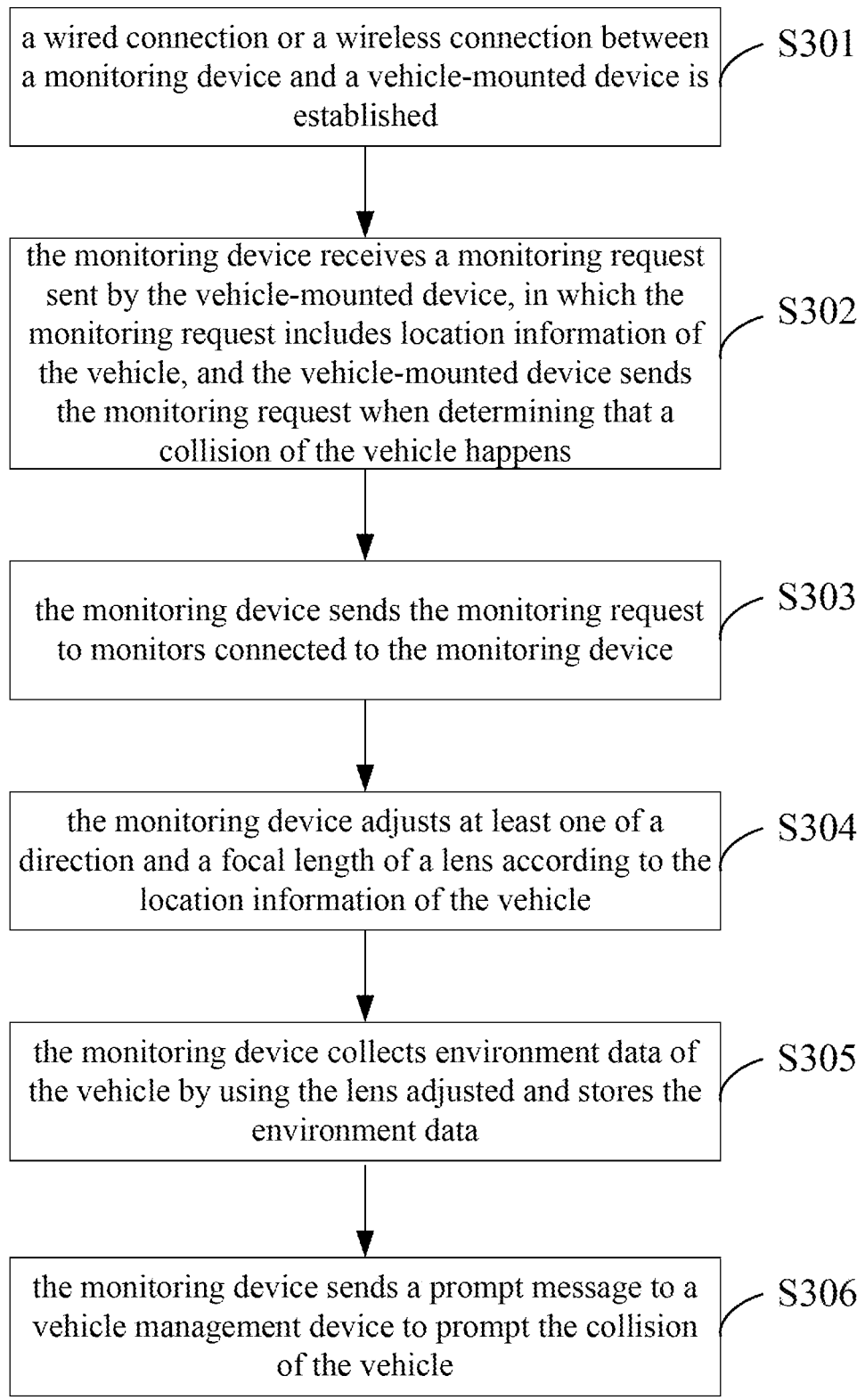
FIG. 3 is a flow chart of a method for monitoring a vehicle according to an exemplary aspect of the present disclosure.

Based on the aspect shown in FIG. 1, FIG. 3 is a flow chart of a method for monitoring a vehicle according to an example aspect. As shown in FIG. 3, the method includes followings.

At block S301, a wired connection or a wireless connection between a monitoring device and a vehicle-mounted device is established.

At block S302, the monitoring device receives a monitoring request sent by the vehicle-mounted device, in which the monitoring request includes location information of the vehicle, and the vehicle-mounted device sends the monitoring request when determining that a collision of the vehicle happens.

At block S303, the monitoring device sends the monitoring request to monitors connected to the monitoring device.

If there are monitors around the monitoring device, the monitoring device may send the monitoring request to a plurality of monitors, and the plurality of monitors may monitor the vehicle. The plurality of monitors may be distributed around the vehicle such that the vehicle may be fully monitored. Each of the plurality of monitors may judge whether to monitor the vehicle according to a distance between the vehicle and the monitor. If the vehicle is far from the monitor, the monitor may not monitor the vehicle, and if the vehicle is close to the monitor, the monitor may monitor the vehicle.

At block S304, the monitoring device adjusts at least one of a direction and a focal length of a lens according to the location information of the vehicle.

At block S305, the monitoring device collects environment data of the vehicle by using the lens adjusted and stores the environment data.

At block S306, the monitoring device sends a prompt message to a vehicle management device to prompt the collision of the vehicle.

In this aspect, after the monitoring device receives the monitoring request sent by the vehicle-mounted device, the monitoring device may send the monitoring request to monitors connected to the monitoring device, so as to enable the monitors to monitor the vehicle and ensure that the vehicle at any position may be monitored. In addition, after the monitoring device receives the monitoring request, the monitoring device sends the prompt message to the vehicle management device, such that managers of the vehicle can deal with the collision in time.

Figure 4:
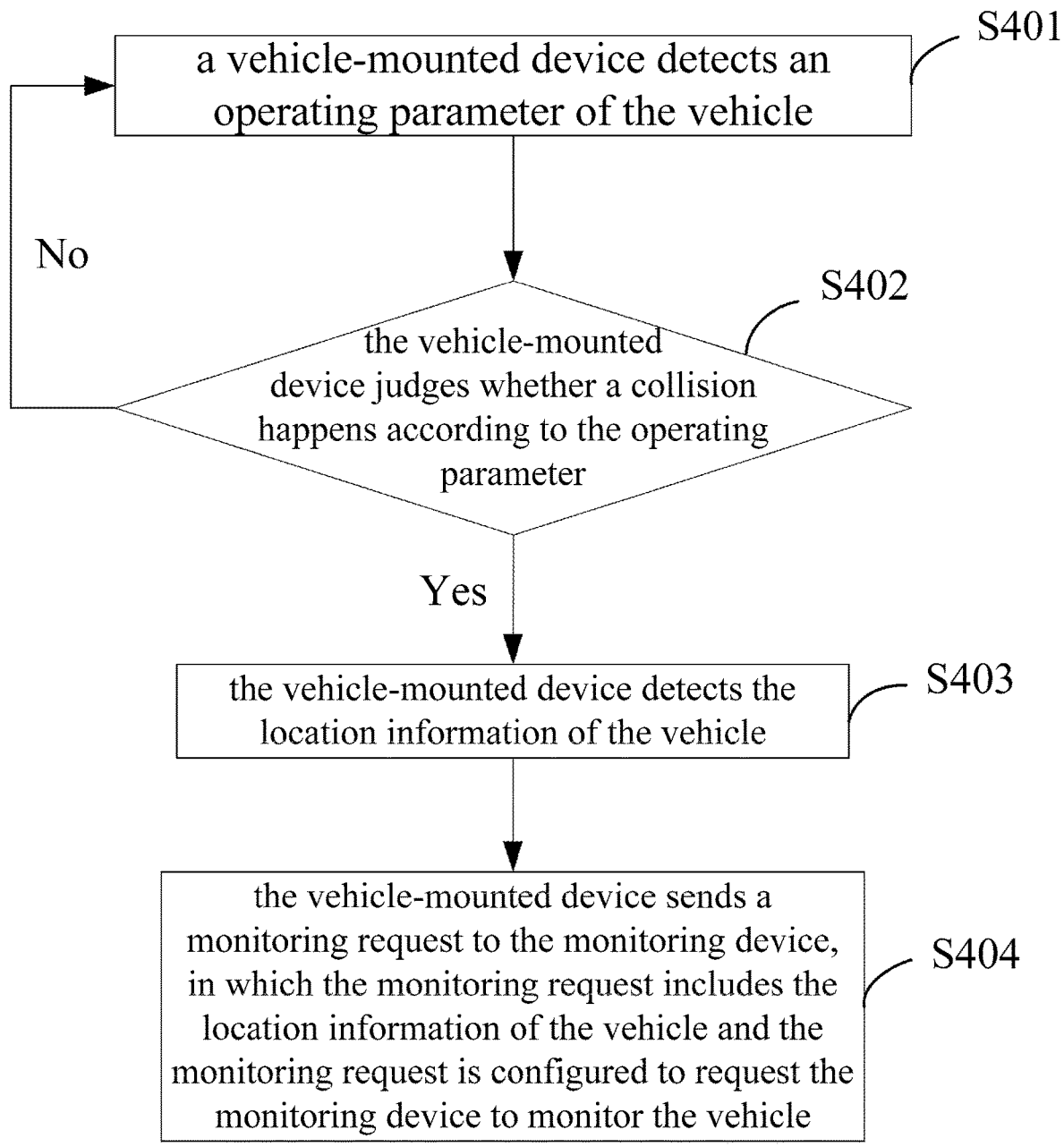
FIG. 4 is a flow chart of a method for monitoring a vehicle according to an exemplary aspect of the present disclosure.

FIG. 4 is a flow chart of a method for monitoring a vehicle according to an example aspect. As shown in FIG. 4, the method includes followings.

At block S401, a vehicle-mounted device detects an operating parameter of the vehicle.

The vehicle-mounted device may detect operating parameters of the vehicle via a gravity sensor and/or a gyroscope, and the operating parameters include operating speed and a vibration amplitude of the vehicle and the like.

At block S402, the vehicle-mounted device judges whether a collision of the vehicle happens according to the operating parameter.

In an implementation, the vehicle-mounted device may determine whether a collision happens by detecting a change of the vibration amplitude of the vehicle. The method is suitable for a situation that the collision happens when the vehicle is driven. In a parking process or when the vehicle is driven out of the parking space, the vehicle may move slowly and there may be a small vibration when the vehicle moves. After the collision happens, there may be an increase in the vibration amplitude of the vehicle due to an external force applied on the vehicle. Therefore, the vehicle-mounted device may detect a great change of the vibration amplitude of the vehicle before and after the collision. The vehicle-mounted device determines whether the change of the vibration amplitude is greater than a first threshold. When the change of the vibration amplitude is greater than the first threshold, it may be determined that the collision happens; when the change of the vibration amplitude is smaller than or equal to the first threshold, it may be determined that there is no collision. This is because when the vehicle moves normally, the vibration amplitude of the vehicle caused by a road roughness or small barriers on the road may be small. However, although there may be a change in the vibration amplitude, no collision happens.

In another implementation, the vehicle-mounted device may judge whether the vibration amplitude of the vehicle is greater than a second threshold. When the vibration amplitude of the vehicle is greater than the second threshold, the vehicle-mounted device may determine that the collision happens; when the vibration amplitude of the vehicle is smaller than the second threshold, the vehicle-mounted device may determine that no collision happens. The method is suitable for a situation in which the collision happens when vehicle is stationary (the vehicle parking in the parking space). In this case, the second threshold is zero and the vibration amplitude of the stationary vehicle is zero. When another vehicle hits the vehicle, there may be a vibration of the vehicle, then the vehicle-mounted device may judge whether the vibration amplitude of the vehicle is greater than the second threshold. When the vibration amplitude of the vehicle is greater than the second threshold, the vehicle-mounted device may determine that the collision happens, which means that it may be determined that the collision happens once there is a vibration. The method is also suitable for a situation in which the collision happens during a moving process of the vehicle. In this case, the second threshold is greater than zero. In other words, it is considered that the collision happens when the vibration amplitude of the vehicle is greater than the second threshold. Of course, the second threshold may be set according to actual situations, which is not limited herein.

In this aspect, act at block S403 is performed when the collision happens, and act at block S401 may be performed when no collision happens.

At block S403, the vehicle-mounted device detects the location information of the vehicle.

The vehicle-mounted device may detect location information of the vehicle by using a GPS module.

At block S404, the vehicle-mounted device sends a monitoring request to the monitoring device, in which the monitoring request includes the location information of the vehicle and the monitoring request is configured to request the monitoring device to monitor the vehicle.

The vehicle-mounted device may send a monitoring request to the monitoring device via a wireless connection or a wired connection. It should be noted that, the wireless connection may be established when the vehicle-mounted device determines to send the monitoring request to the monitoring device or after the vehicle enters the parking lot.

In this aspect, the vehicle-mounted device may detect the operating parameter of the vehicle, and judges whether a collision happens according to the operating parameter. When the collision happens, the vehicle-mounted device may detect the location information of the vehicle and send the monitoring request to the monitoring device, in which the monitoring request includes the location information of the vehicle and the monitoring request is configured to request the monitoring device to monitor the vehicle. In this way, when the collision happens, by sending the location information of the vehicle to the monitoring device in the parking lot, the monitoring device may monitor the vehicle according to the location information, such that the monitoring pictures are clear and effective and the monitoring cost is low.

Figure 5:
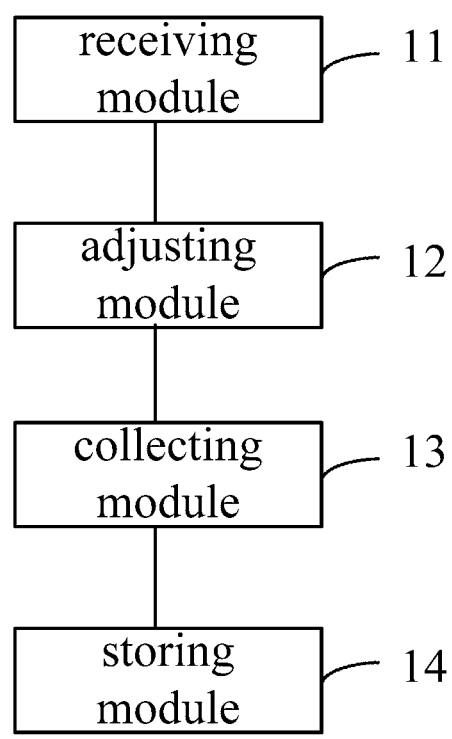
FIG. 5 is a block diagram of a monitoring device according to an exemplary aspect of the present disclosure.

FIG. 5 is a block diagram of a monitoring device according to an example aspect. As shown in FIG. 5, the monitoring device includes: a receiving module 11, an adjusting module 12, a collecting module 13 and a storing module 14.

The receiving module 11 is configured to receive a monitoring request sent by a vehicle-mounted device, in which the monitoring request includes location information of the vehicle, and the vehicle-mounted device sends the monitoring request when determining that a collision of the vehicle happens.

The adjusting module 12 is configured to adjust at least one of a direction and a focal length of a lens according to the location information of the vehicle.

The collecting module 13 is configured to collect environment data of the vehicle by using the lens adjusted.

The storing module 14 is configured to store the environment data.

Figure 6:
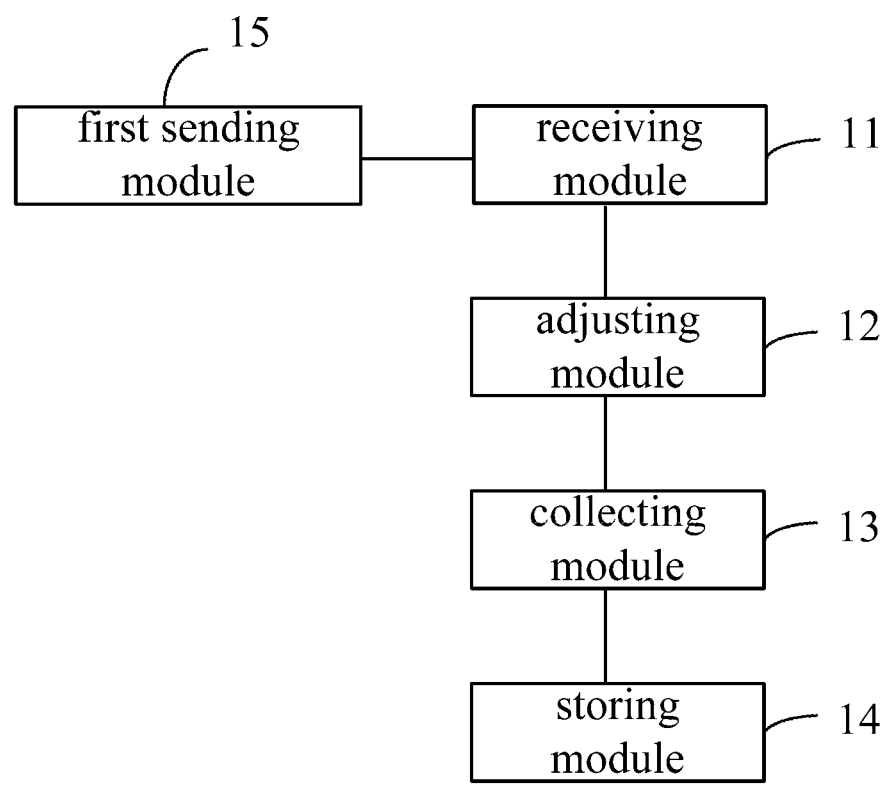
FIG. 6 is a block diagram of a monitoring device according to an exemplary aspect of the present disclosure.

FIG. 6 is a block diagram of a monitoring device according to an example aspect. As shown in FIG. 6, based on the monitoring device shown in FIG. 5, the monitoring device further includes a first sending module 15, configured to send the monitoring request to monitors connected to the monitoring device.

Figure 7:
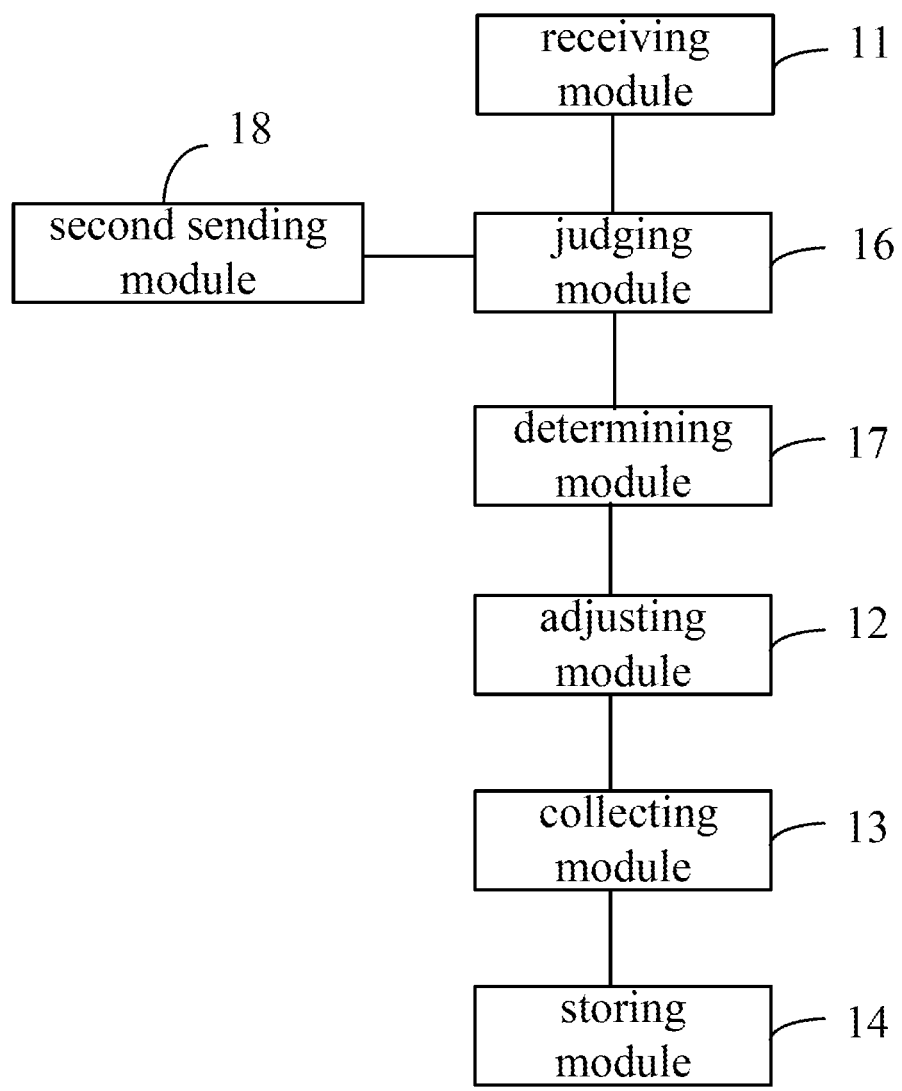
FIG. 7 is a block diagram of a monitoring device according to an exemplary aspect of the present disclosure.

FIG. 7 is a block diagram of a monitoring device according to an example aspect. As shown in FIG. 7, based on the monitoring device shown in FIG. 5, the monitoring device further includes a judging module 16, a determining module 17 and a second sending module 18.

The judging module 16 is configured to judge whether a distance between the monitoring device and the vehicle is smaller than a first threshold according to the location information.

The determining module 17 is configured to determine to adjust the at least one of the direction and the focal length of the lens when the distance between the monitoring device and the vehicle is smaller than the first threshold.

The second sending module 18 is configured to send the monitoring request to monitors connected to the monitoring device when the distance between the monitoring device and the vehicle is greater than or equal to the first threshold.

Figure 8:
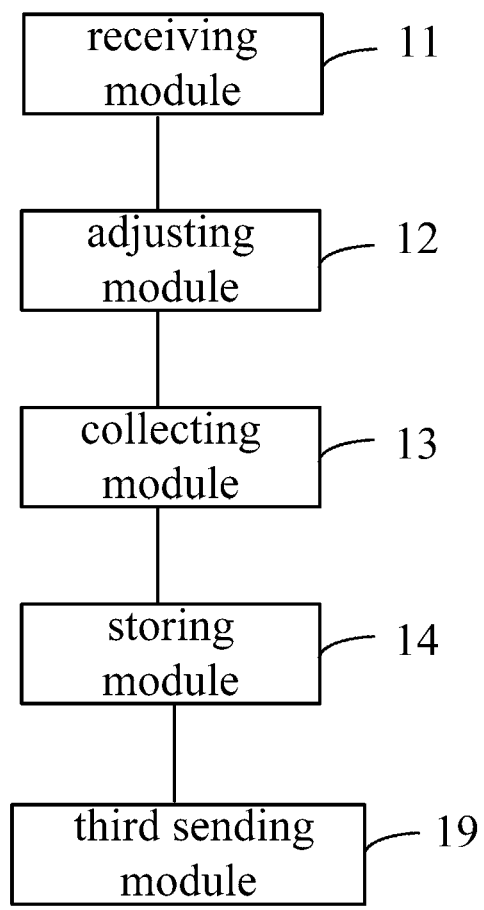
FIG. 8 is a block diagram of a monitoring device according to an exemplary aspect of the present disclosure.

FIG. 8 is a block diagram of a monitoring device according to an example aspect. As shown in FIG. 8, based on the monitoring device shown in FIG. 5, the monitoring device further includes a third sending module 19, configured to send a prompt message to a vehicle management device, in which the prompt message is used to prompt the collision of the vehicle.

Figure 9:
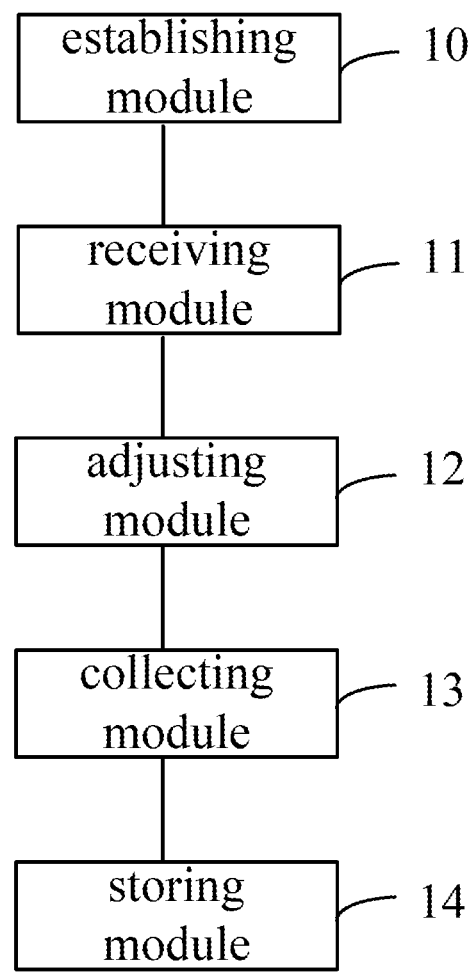
FIG. 9 is a block diagram of a monitoring device according to an exemplary aspect of the present disclosure.

FIG. 9 is a block diagram of a monitoring device according to an example aspect. As shown in FIG. 9, based on the monitoring device shown in FIG. 5, the monitoring device further includes an establishing module 10, configured to establish one of a wired connection and a wireless connection between the monitoring device and the vehicle-mounted device, in which the one of the wired connection and the wireless connection is used for communicating between the monitoring device and the vehicle-mounted device.

Figure 10:
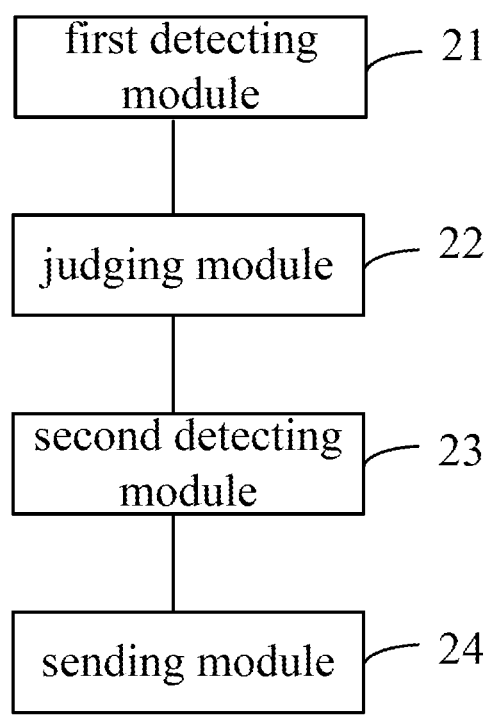
FIG. 10 is a block diagram of a vehicle-mounted device according to an exemplary aspect of the present disclosure.

FIG. 10 is a block diagram of a vehicle-mounted device according to an example aspect. As shown in FIG. 10, the vehicle-mounted device includes a first detecting module 21, a judging module 22, a second detecting module 23 and a sending module 24.

The first detecting module 21 is configured to detect an operating parameter of the vehicle.

The judging module 22 is configured to judge whether a collision of the vehicle happens according to the operating parameter.

The second detecting module 23 is configured to detect location information of the vehicle when the collision of the vehicle happens.

The sending module 24 is configured to send a monitoring request to a monitoring device, in which the monitoring request includes the location information of the vehicle and the monitoring request is configured to request the monitoring device to monitor the vehicle.

Figure 11:
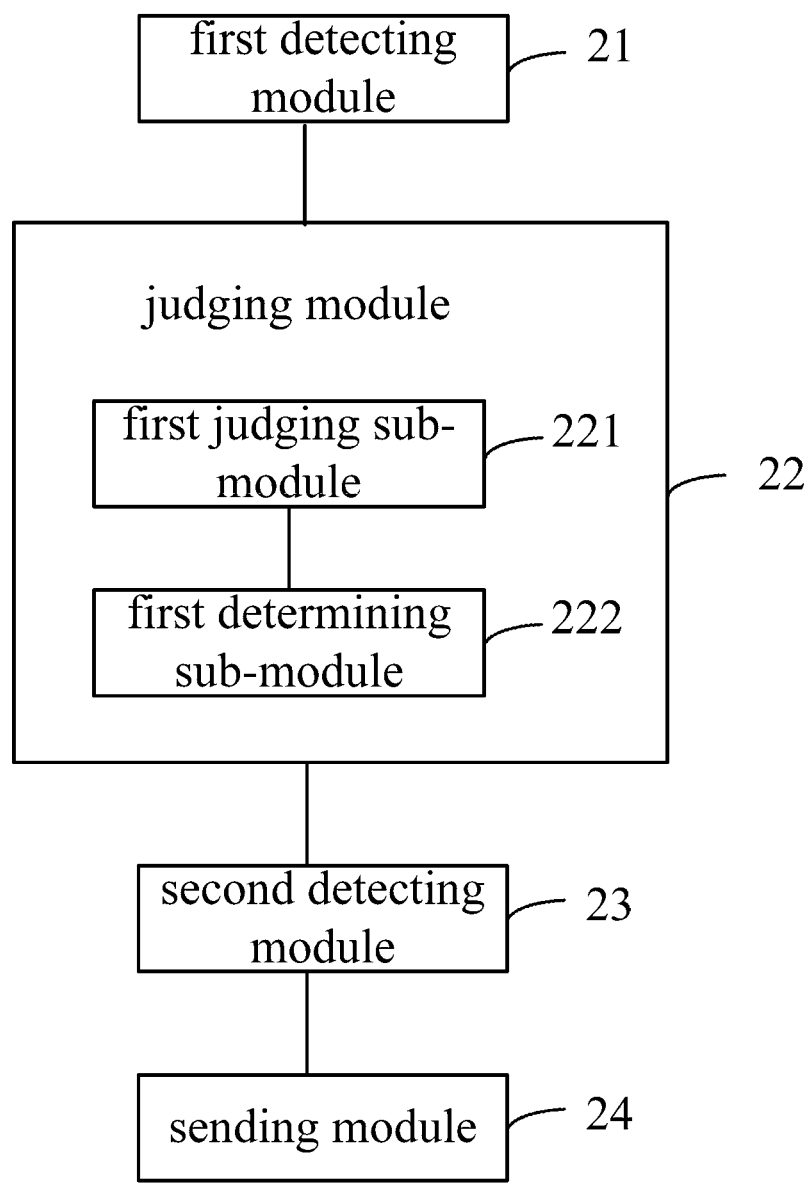
FIG. 11 is a block diagram of a vehicle-mounted device according to an exemplary aspect of the present disclosure.

FIG. 11 is a block diagram of a vehicle-mounted device according to an example aspect. As shown in FIG. 11, based on the vehicle-mounted device shown in FIG. 10, the judging module 22 includes a first judging sub-module 221 and a first determining sub-module 222.

The first judging sub-module 221 is configured to judge whether a change of a vibration amplitude of the vehicle is greater than a first threshold when the vibration amplitude of the vehicle changes.

The first determining sub-module 222 is configured to determine that the collision of the vehicle happens when the change of the vibration amplitude of the vehicle is greater than the first threshold.

Figure 12:
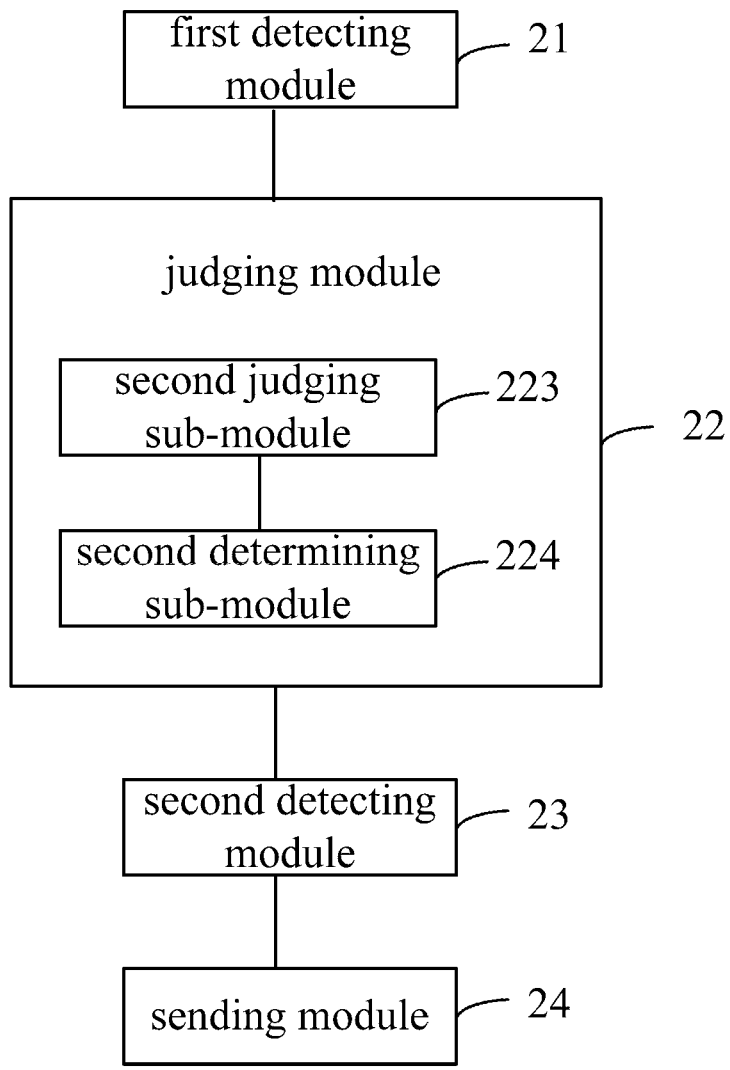
FIG. 12 is a block diagram of a vehicle-mounted device according to an exemplary aspect of the present disclosure.

FIG. 12 is a block diagram of a vehicle-mounted device according to an example aspect. As shown in FIG. 12, based on the vehicle-mounted device shown in FIG. 10, the judging module 22 includes a second judging sub-module 223 and a second determining sub-module 224.

The second judging sub-module 223 is configured to judge whether a vibration amplitude of the vehicle is greater than a second threshold.

The second determining sub-module 224 is configured to determine that the collision of the vehicle happens when the vibration amplitude of the vehicle is greater than the second threshold.

Figure 13:
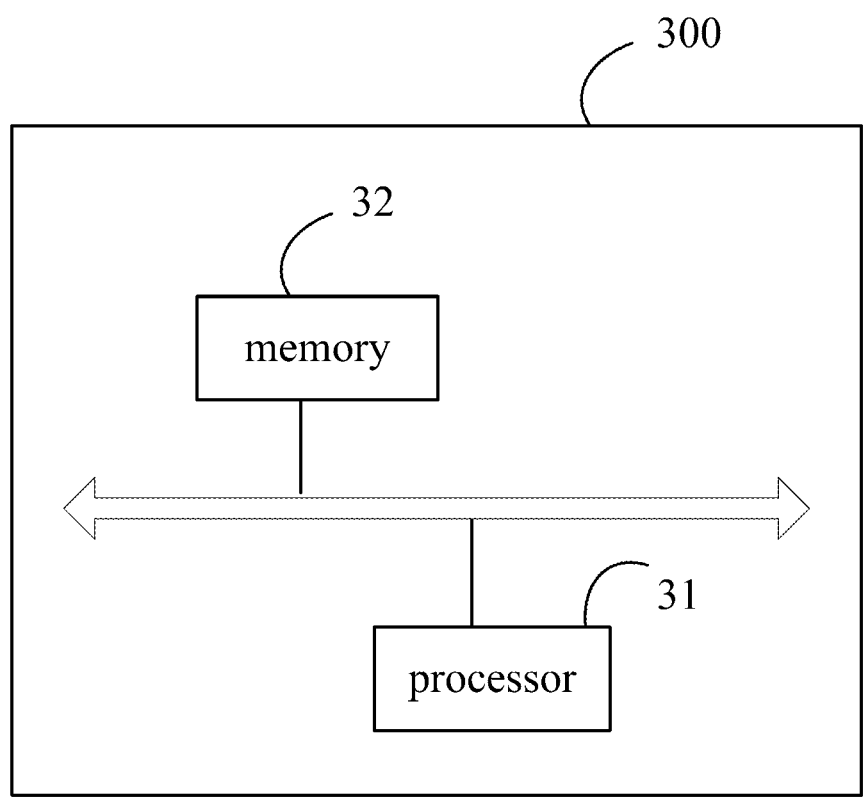
FIG. 13 is a block diagram of a monitoring apparatus according to an exemplary aspect of the present disclosure.

FIG. 13 is a block diagram of a monitoring apparatus according to an example aspect. As shown in FIG. 13, the monitoring apparatus 300 includes a processor 31 and a memory 32 configured to store an instruction executable by the processor 31, in which the memory 32 is connected to and communicate with the processor 31 via a system bus.

The processor 31 is configured to receive a monitoring request sent by a vehicle-mounted device, in which the monitoring request includes location information of the vehicle, and the vehicle-mounted device sends the monitoring request when determining that a collision of the vehicle happens; to adjust at least one of a direction and a focal length of a lens according to the location information of the vehicle; and to collect environment data of the vehicle by using the lens adjusted and store the environment data.

Figure 14:
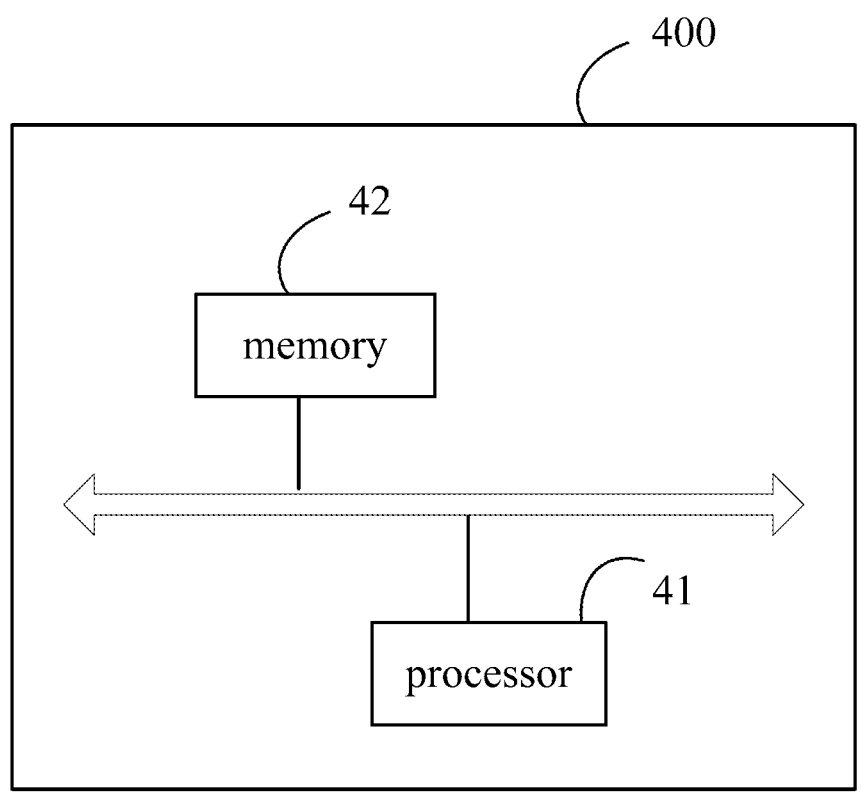
FIG. 14 is a block diagram of a vehicle-mounted apparatus according to an exemplary aspect of the present disclosure.

FIG. 14 is a block diagram of a vehicle-mounted apparatus according to an example aspect. As shown in FIG. 14, the monitoring apparatus 400 includes a processor 41 and a memory 42 configured to store an instruction executable by the processor 41, in which the memory 42 is connected to and communicate with the processor 41 via a system bus.

The processor 41 is configured to detect an operating parameter of the vehicle; to judge whether a collision of the vehicle happens according to the operating parameter; to detect location information of the vehicle when the collision of the vehicle happens; and to send a monitoring request to a monitoring device, in which the monitoring request includes the location information of the vehicle and the monitoring request is configured to request the monitoring device to monitor the vehicle.

It should be noted that, in above aspects, the processor may be a central processing unit (CPU for short), other general processors, a digital signal processor (DSP for short), application specific integrated circuit (ASIC for short) and the like. The general processors may include a microprocessor or other normal processors. The memory mentioned above may be a read-only memory (ROM for short), a random access memory (RAM for short), a flash memory, a hard disk or a solid state disk. Steps in the method according to aspects of the present disclosure may be performed by a hardware processor or by a combination of hardware and software in the processor.

Figure 15:
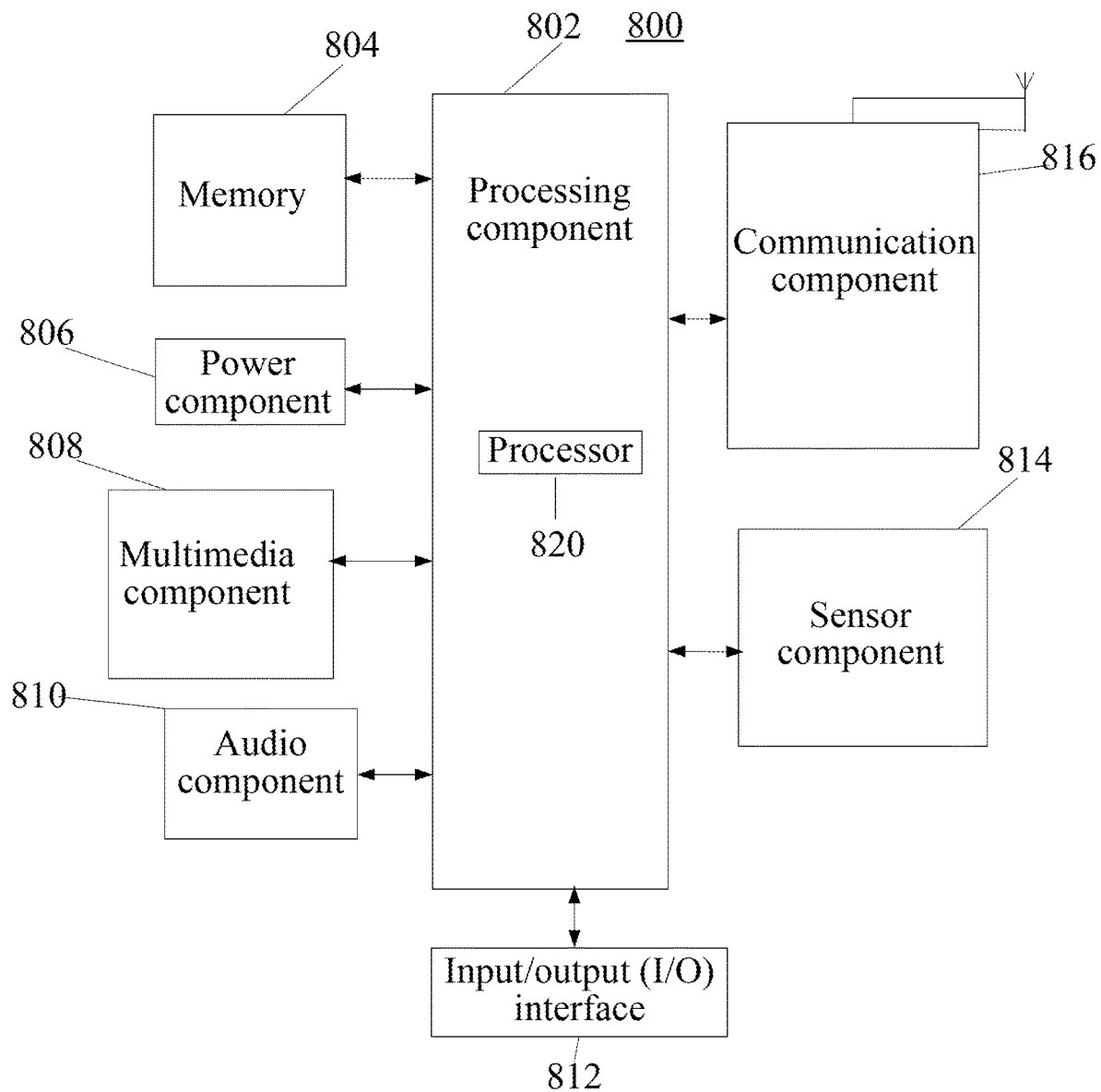
FIG. 15 is a block diagram of a vehicle-mounted apparatus 800 according to an exemplary aspect of the present disclosure.

FIG. 15 is a block diagram of a vehicle-mounted apparatus 800 according to an example aspect. For example, the vehicle-mounted apparatus 800 may be a mobile phone, a computer, a digital broadcasting terminal, a message sending and receiving equipment, a game controller, a tablet device, a medical device, a fitness equipment, a personal digital assistant or the like.

Referring to FIG. 15, the vehicle-mounted apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the vehicle-mounted apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the vehicle-mounted apparatus 800. Examples of such data include instructions for any applications or methods operated on the vehicle-mounted apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the vehicle-mounted apparatus 800. The power component 806 may include a power management system, one or more power sources, and any other components associated with the generation, management, and distribution of power in the vehicle-mounted apparatus 800.

The multimedia component 808 includes a screen providing an output interface between the vehicle-mounted apparatus 800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. The front camera and the rear camera may receive an external multimedia datum while the vehicle-mounted apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the vehicle-mounted apparatus 800 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the vehicle-mounted apparatus 800. For instance, the sensor component 814 may detect an open/closed status of the vehicle-mounted apparatus 800, relative positioning of components, e.g., the display and the keypad, of the vehicle-mounted apparatus 800, a change in position of the vehicle-mounted apparatus 800 or a component of the vehicle-mounted apparatus 800, a presence or absence of user contact with the vehicle-mounted apparatus 800, an orientation or an acceleration/deceleration of the vehicle-mounted apparatus 800, and a change in temperature of the vehicle-mounted apparatus 800. The sensor component 814 may include a proximity sensor configured to detect the presence of nearby objects without any physical contact. The sensor component 814 may also include a light sensor, such as a CMOS or CCD image sensor, for use in imaging applications. In some aspects, the sensor component 814 may also include an accelerometer sensor, a gyroscope sensor, a magnetic sensor, a pressure sensor, or a temperature sensor.

The communication component 816 is configured to facilitate communication, wired or wirelessly, between the vehicle-mounted apparatus 800 and other devices. The vehicle-mounted apparatus 800 can access a wireless network based on a communication standard, such as WiFi, 2G, or 3G, or a combination thereof. In one example aspect, the communication component 816 receives a broadcast signal or broadcast associated information from an external broadcast management system via a broadcast channel In one example aspect, the communication component 816 further includes a near field communication (NFC) module to facilitate short-range communications. For example, the NFC module may be implemented based on a radio frequency identification (RFID) technology, an infrared data association (IrDA) technology, an ultra-wideband (UVB) technology, a Bluetooth (BT) technology, and other technologies.

In example aspects, the vehicle-mounted apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for monitoring a vehicle as shown in FIG. 4.

In exemplary aspects, there is also provided a non-transitory computer-readable storage medium including instructions, such as included in the memory 804, executable by the processor 820 in the vehicle-mounted apparatus 800, for performing the method for monitoring a vehicle as shown in FIG. 4. For example, the non-transitory computer-readable storage medium may be a ROM, a RAM, a CD-ROM, a magnetic tape, a floppy disc, an optical data storage device, and the like.

A non-transitory computer-readable storage medium has stored therein instructions that, when executed by a processor of a vehicle-mounted device, causes the vehicle-mounted device to perform a method for monitoring a vehicle as shown in FIG. 4.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for monitoring a vehicle, comprising:
   establishing, by a monitoring device having a lens and mounted in a parking lot, a communication with a vehicle-mounted device when the vehicle-mounted device enters the parking lot, wherein the vehicle-mounted device comprises a portable smart device owned by a user in the vehicle;
   receiving, by the monitoring device, a monitoring request from the vehicle-mounted device, wherein the monitoring request includes location information of the vehicle, and the vehicle-mounted device sends the monitoring request when detecting a collision of the vehicle;
   adjusting a direction and a focal length of the lens based on the location information of the vehicle to align the lens with the vehicle;
   collecting environment data of the vehicle via the adjusted lens; and
   storing the environment data.

2. The method according to claim 1, further comprising:
   after receiving the monitoring request, sending the monitoring request from the monitoring device to monitors connected to the monitoring device.

3. The method according to claim 2, further comprising:
   sending a prompt message from the monitoring device to a vehicle management device including circuitry, wherein the prompt message is configured to report the collision of the vehicle.

4. The method according to claim 1, further comprising:
   determining a distance between the monitoring device and the vehicle based on the location information;
   comparing the distance to a threshold;
   adjusting at least one of the direction and the focal length of the lens when the distance between the monitoring device and the vehicle is less than the threshold; and
   sending the monitoring request from the monitoring device to monitors connected to the monitoring device when the distance between the monitoring device and the vehicle is greater than or equal to the threshold.

5. The method according to claim 4, further comprising:
   sending a prompt message from the monitoring device to a vehicle management device including circuitry, wherein the prompt message is configured to report the collision of the vehicle.

6. The method according to claim 1, wherein establishing, by the monitoring device having the lens and mounted in the parking lot, the communication with the vehicle-mounted device comprises:
   establishing one of a wired connection and a wireless connection between the monitoring device and the vehicle-mounted device, wherein the one of the wired connection and the wireless connection is used for communicating between the monitoring device and the vehicle-mounted device.

7. The method according to claim 6, further comprising:
   sending a prompt message from the monitoring device to a vehicle management device including circuitry, wherein the prompt message is configured to report the collision of the vehicle.

8. The method according to claim 1, further comprising:
   sending a prompt message from the monitoring device to a vehicle management device including circuitry, wherein the prompt message is configured to report the collision of the vehicle.

9. The method according to claim 1, wherein the environment data includes information on vehicles that are moving in proximity of the vehicle, information on objects including individuals that are moving in proximity of the vehicle, and information on vehicles that are parked in proximity of the vehicle.

10. A method for monitoring a vehicle, comprising:
    communicating, by a vehicle-mounted device, with a monitoring device having a lens and mounted in a parking lot when the vehicle-mounted device enters the parking lot, wherein the vehicle-mounted device comprises a portable smart device owned by a user in the vehicle;
    monitoring, by the vehicle-mounted device, an operating parameter of the vehicle;
    detecting a collision of the vehicle based on the operating parameter;
    determining location information of the vehicle in response to detecting the collision of the vehicle; and
    sending a monitoring request from the vehicle-mounted device to the monitoring device, wherein the monitoring request includes the location information of the vehicle and the monitoring request is configured to request the monitoring device to monitor the vehicle, so as to cause the monitoring device to adjust a direction and a focal length of the lens according to the location information of the vehicle to align the lens with the vehicle.

11. The method according to claim 10, wherein detecting the collision of the vehicle comprises:
    detecting a change of a vibration amplitude of the vehicle;
    comparing the change of the vibration amplitude to a threshold; and detecting the collision of the vehicle when the change of the vibration amplitude of the vehicle is greater than the threshold.

12. The method according to claim 10, wherein detecting the collision of the vehicle comprises:
   determining, a vibration amplitude of the vehicle;
   comparing the vibration amplitude to a threshold; and
   detecting the collision of the vehicle when the vibration amplitude of the vehicle is greater than the threshold.

13. An apparatus for monitoring a vehicle, comprising:
   a processor;
   a memory configured to store at least one instruction executable by the processor;
   wherein the processor is configured to:
      establish, by a monitoring device having a lens and mounted in a parking lot, a communication with a vehicle-mounted device when the vehicle-mounted device enters the parking lot, wherein the vehicle-mounted device comprises a portable smart device owned by a user in the vehicle;
      receive, by the monitoring device, a monitoring request from the vehicle-mounted device, wherein the monitoring request includes location information of the vehicle, and the vehicle-mounted device sends the monitoring request when detecting a collision of the vehicle;
      adjust a direction and a focal length of the lens based on the location information of the vehicle to align the lens with the vehicle;
      collect environment data of the vehicle via the adjusted lens; and
      store the environment data.

14. The apparatus according to claim 13, wherein the processor is further configured to:
   send the monitoring request to monitors connected to the monitoring device.

15. The monitoring apparatus according to claim 14, wherein the processor is further configured to:
   send a prompt message to a vehicle management device including circuitry, wherein the prompt message is configured to report the collision of the vehicle.

16. The apparatus according to claim 13, wherein the processor is further configured to:
   determine a distance between the monitoring device and the vehicle based on the location information;
   compare the distance to a threshold;
   adjust the at least one of the direction and the focal length of the lens when the distance between the monitoring device and the vehicle is less than the threshold; and
   send the monitoring request to monitors connected to the monitoring device when the distance between the monitoring device and the vehicle is greater than or equal to the threshold.

17. The apparatus according to claim 16, wherein the processor is further configured to:
   send a prompt message to a vehicle management device including circuitry, wherein the prompt message is configured to report the collision of the vehicle.

18. The apparatus according to claim 13, wherein the processor is further configured to:
   establish one of a wired connection and a wireless connection between the monitoring device and the vehicle-mounted device, wherein the one of the wired connection and the wireless connection is used for communicating between the monitoring device and the vehicle-mounted device.

19. The apparatus according to claim 18, wherein the processor is further configured to:
   send a prompt message to a vehicle management device including circuitry, wherein the prompt message is configured to report the collision of the vehicle.

20. The apparatus according to claim 13, wherein the processor is further configured to:
   send a prompt message to a vehicle management device including circuitry, wherein the prompt message is configured to report the collision of the vehicle.

* * * * *